(12) United States Patent
Mogul et al.

(10) Patent No.: US 7,437,438 B2
(45) Date of Patent: Oct. 14, 2008

(54) SYSTEM AND METHOD FOR ENERGY EFFICIENT DATA PREFETCHING

(75) Inventors: Jeffrey Clifford Mogul, Menlo Park, CA (US); Keith Istvan Farkas, San Carlos, CA (US); Parthasarathy Ranganathan, Palo Alto, CA (US); Eduardo S. Pinheiro, Highland Park, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1329 days.

(21) Appl. No.: 10/033,404

(22) Filed: Dec. 27, 2001

(65) Prior Publication Data

US 2003/0126232 A1 Jul. 3, 2003

(51) Int. Cl.
*G06F 15/173* (2006.01)
(52) U.S. Cl. ...................... 709/223; 709/226
(58) Field of Classification Search ................ 709/202, 709/219, 217, 231, 223, 224, 226
See application file for complete search history.

(56) References Cited

U.S. PATENT DOCUMENTS

| | | | | | |
|---|---|---|---|---|---|
| 5,305,389 | A | * | 4/1994 | Palmer ........................ | 382/305 |
| 5,925,100 | A | * | 7/1999 | Drewry et al. .............. | 709/219 |
| 6,023,726 | A | * | 2/2000 | Saksena ...................... | 709/219 |
| 6,055,572 | A | * | 4/2000 | Saksena ...................... | 709/224 |
| 6,085,193 | A | * | 7/2000 | Malkin et al. ................ | 707/10 |
| 6,167,438 | A | * | 12/2000 | Yates et al. .................. | 709/216 |
| 6,173,392 | B1 | * | 1/2001 | Shinozaki .................... | 712/207 |
| 6,182,122 | B1 | * | 1/2001 | Berstis ........................ | 709/217 |
| 6,725,267 | B1 | * | 4/2004 | Hoang ......................... | 709/226 |
| 6,728,840 | B1 | * | 4/2004 | Shatil et al. ................. | 711/137 |
| 2001/0044851 | A1 | * | 11/2001 | Rothman et al. ............ | 709/231 |
| 2002/0049833 | A1 | * | 4/2002 | Kikinis ........................ | 709/219 |
| 2002/0103778 | A1 | * | 8/2002 | Saxena ......................... | 707/1 |
| 2003/0097443 | A1 | * | 5/2003 | Gillett et al. ................ | 709/225 |

OTHER PUBLICATIONS

Grassi, V. "Prefetching Policies for Energy Saving and Latency Reduction in a Wireless Broadcast Data Delivery System," International Workshop on Modeling Analysis and Simulation of Wireless and Mobil Systems Proceedings of the 3rd ACM, 2000, pp. 77-84.*

(Continued)

*Primary Examiner*—Jason Cardone
*Assistant Examiner*—Brian J Gillis

(57) ABSTRACT

A computer system uses a prefetch prediction model having energy usage parameters to predict the impact of prefetching specified files on the system's energy usage. A prefetch prediction engine utilizes the prefetch prediction model to evaluate the specified files with respect to prefetch criteria, including energy efficiency prefetch criteria, and generates a prefetch decision with respect to each file of the specified files. For each specified file for which the prefetch prediction engine generates an affirmative prefetch decision, an identifying entry is stored in a queue. The computer system fetches files identified by entries in the queue, although some or all of the entries in the queue at any one time may be deleted if it is determined that the identified files are no longer likely to be needed by the computer system.

39 Claims, 7 Drawing Sheets

OTHER PUBLICATIONS

Aditya et al.,"Protocols For Low-Power," Project Report for Graduate Networks Class, Spring 2001, CMU.

Bestavros, Azer, "Speculative Data Dissemination and Service," *In Proceedings of ICDE'96: The International Converence On Data Engineering*, New Orleans, Louisiana, Mar. 1996.

Cai et al., "Energy-Efficient Selective Cache Invalidation", *Wireless Networks (WINET)*, ACM/Baltzer, 1999, vol. 5, No. 6, pp. 489-502.

Chandra et al., "Resource Management For Scalable Disconnected Access To Web Services," Department Of Computer Sciences The University of Texas at Austin, May 2001.

Douglis et al., "Adaptive Disk Spin-down Policies for Mobile Computers," *Computing Systems*, 8(4):381-413, Fall 1995.

Feeney et al., "Investigating The Energy Consumption Of An IEEE 802.11 Network Interface," *SICS Technical Report T99/11*, pp. 1-19, Dec. 1999.

Helmbold et al., "A dynamic disk spin-down technique for mobile computing," *In Proceedings of the Second Annual International Conference on Mobile Computing and Networking*, pp. 130-142, White Plains, NY, Nov. 1996.

http://www.10.org/cdrom/papers/papers/477/index,html , "N for the Price of 1: Bundling Web Objects For More Efficient Content Delivery*," Accessed on Mar. 26, 2002, pp. 1-13.

Imielinski, Tomasz, "Energy Efficient Data Filtering And Communication In Mobile Wireless Computing," Department of Computer Science, Rutgers University, New Brunswick, NJ, http://www.usenix.org/publications/libra...eedings/mob95/full_papers/imielinski.txt, Accessed on Mar. 26, 2002, pp. 1-13.

Jedrzycki et al., "Optimal Channel Assignment Strategies For Forced Channel Hopping In CDPD Systems," *Mobile Networks And Applications* 5(2000), pp. 5-16.

Kravets et al., "Power Management Techniques For Mobile Communication," http://www-sal.cs.uiuc.edu/rhk/papers/html/power/power.html, Accessed on Mar. 26, 2002 pp. 1-20.

Kroeger et al., "Exploring the Bounds of Web Latency Reduction from Caching and Prefetching. In Proc." *Symposium on Internet Technologies and Systems*, pp. 13-22. USENIX, Monterey, CA, Dec. 1997.

Lebeck et al.,"Power Aware Page Allocation," Department Of Computer Science, Duke University, Durham North Carolina 27708-0129, Report CS-2000-08, pp. 1-22.

Lorch et al., "Software Strategies For Portable Energy Management," *IEEE Personal Communications Magazine*, vol. 5, No. 3, pp. 60-73, Jun. 1998.

Pitkow et al.,"Mining Longest Repeating Subsequences To Predict World Wide Web Surfing," *Proceedings Of USITS'99: The 2nd USENIX Symposium On Internet Technologies & Systems*, Boulder Colorado, USA, Oct. 11-14, 1999, pp. 1-12.

Singh et al., "Power-Aware Routing In Mobile Ad-Hoc Networks," *Proceeding of the Fourth Annual ACM/IEEE International Conference On Mobile Computing And Networking*, pp. 181-190, 1998.

Stemm et al., "Measuring And Reducing Energy Consumption Of Network Interfaces In Hand-Held Devices," *IEICE Trans. Commun.*, vol. E80-B, No. 8, pp. 1125-1131, Aug. 1997.

Stemm et al., "Reducing Power Consumption of Network Interfaces in Hand-Held Devices," *In Proc $3^{rd}$ International Workshop on Mobile Multimedia Communications (MoMuc-3)*, Princeton, NJ, USA, Sep. 1996.

Tan, K.L. "Organization of Invalidation Reports for Energy-Efficient Cache Invalidation in Mobile Environments", *Mobile Networks and Applications (MONET)*, ACM/Baltzer, accepted for publication, 2000.

Touch et al., "An Experiment in Latency Reduction," *IEEE Infocom*, Toronto, Jun. 1994, pp. 175-181.

Venkata et al., "Using Predictive Prefetching to Improve World Wide Web Latency," *Computer Communication Review*, 1996, 26(3):22-36.

Wu et al., "Energy-Efficient Caching for Wireless Mobile Computing IBM T. J. Watson Research Center," *Proceedings of the 1996 International Conference on Data Engineering (ICDE '96)*.

Balan et al., "Multi-Modul Network Protocols," Computer Science Department, Carnegie Mellon University, {rajesh,aditya}@cs.cmu.edu,srini@cmu.edu., Jan. 2002.

Reinmann et al., "High Performance and Energy Efficient Serial Prefetch Architecture," *In the Proceedings of the $4^{th}$ International Symposium on High Performance Computing (ISHPC)* 5(2002), pp. 1-14.

Sconyers, T., "An Examination of Power Consumption in Wireless Modems," University of California, Santa Cruz, *The Thesis Tracey Sconyers* 6(1998) pp. 1-66.

* cited by examiner

Message Sent by Server to Client
in Response to a Request

Prefetch Prediction Model

Request Message Sent by Client to Server, including Client Hints

SYSTEM AND METHOD FOR ENERGY EFFICIENT DATA PREFETCHING

The present invention relates generally to the performance enhancement of prefetching in a network environment and particularly to energy-efficient prefetching of files in a network environment.

BACKGROUND OF THE INVENTION

In networked environments, such as the Internet or communications networks, fetch latency is inevitable. Fetch latency is the time lag between when an object (e.g., a document or file) is requested and when the object is received. In a computer network environment, fetch latency is often referred to as page fetch latency. Page fetch latency is measured by the time lag between when users of client computer systems click on a page link to when the page actually appears on their screens. Page fetch latency may vary depending upon many factors, including available bandwidth.

Two responses to high page fetch latency in the World Wide Web ("WWW") context are the use of mirroring and caching. Mirroring reduces fetch latency. However, mirroring requires manual target selection, which can be difficult to administer. Caching is typically implemented by having a proxy server store (i.e., cache) copies of frequently accessed objects. The proxy server, which may also be called a cache server, is typically located near one or more client computers, and is used to reduce network load. User requests for objects are initially directed to the proxy server, instead of the web servers at the network addresses specified in the user requests. If the object specified by the user request is in the proxy server, the proxy server sends the object to the requesting client without accessing the web server at the specified network address. Caching reduces fetch latency for repeatedly accessed objects, but does not improve first retrieval.

The world wide web allows caching at multiple points, so a cache mechanism is also typically implemented as part of the user agent program (e.g., a web browser) that runs on a client computer. Alternatively, or in addition, a proxy cache server can be implemented as an application or process that runs on the client computer, separate from the user agent program. The use of a proxy cache server located on the same computer as the user agent program is sometimes used to extend the functionality of the user agent program without directly modifying that program, while preserving the benefits of locating the cache on the same computer.

Prefetching can also be used to avoid, or at least to reduce, fetch latency. Prefetching is a technique whereby a client predicts a future request for a file on a remote server, fetches (i.e., prefetches) the file in advance, and stores the prefetched file in a local cache. Thus, the file is stored in the local cache before the client makes an explicit request for it. Access by the client to the local cache is much faster than access to the remote server. Thus, if the client does indeed request the file as predicted, the fetch latency is less than it would have been if the client requested the file from the remote system without prefetching.

Prefetching can improve retrieval times for even first-time page fetch requests, which is not possible with caching alone. However, prefetching can also result in the waste of system resources when a prefetched file is not requested by the user during the time that the prefetched file remains in the client computer's cache. Prefetching can even result in an increase in fetch latency when the prefetching of files interferes with demand fetching, which is the fetching of files actually requested by the user. More generally, the extra load imposed on client, server and network resources by prefetching may degrade performance of one or more of the client, server and network, especially if a large number of files are prefetched and the accuracy of the prefetching is low.

The present invention is based, in part, on the observation that energy efficiency is not a factor considered in prior art prefetching schemes. Energy efficiency is particularly important in battery powered, portable devices, and is also important in other contexts. Prefetching may increase energy usage by the client, server and/or network because the total number of files fetched is increased by the prefetching, since at least some of the prefetched files will not be used by the client computer while the files remain in the client computer's cache. The lower the accuracy of the prefetch predictions, the higher the energy usage will be. However, there may also be energy usage efficiencies associated with prefetching, because fetching multiple files in a burst may be more energy efficient than fetching the same files one at a time with periods of inactivity between the individual file fetches. More generally, there is a tradeoff between energy efficiency and the extent to which average fetch latency is decreased through the use of prefetching.

It would therefore be advantageous to provide an energy-efficient prefetching system and method that improves user-perceived network performance with prefetching.

SUMMARY OF THE INVENTION

In summary, the present invention is a system and method for performing energy efficient data prefetching in conjunction with a client computer system. The client computer system uses a prefetch prediction model having energy usage parameters to predict, or otherwise take into account, the impact of prefetching specified files on the system's energy usage. A prefetch prediction engine utilizes the prefetch prediction model to evaluate the specified files with respect to prefetch criteria, including energy efficiency prefetch criteria, and generates a prefetch decision with respect to each file of the specified files. For each specified file for which the prefetch prediction engine generates an affirmative prefetch decision, an identifying entry is stored in a queue. The client computer system fetches files identified by entries in the queue, although some or all of the entries in the queue at any one time may be deleted if it is determined that the identified files are no longer likely to be needed by the client.

In an other aspect of the invention, a server computer includes a server module for responding to a request from a client computer for a specified file and for generating a reply to the request. The reply includes a content portion comprising the specified file and a supplemental portion distinct from the content portion. A prefetch predictor identifies additional files for possible prefetching by the client computer. The server module includes in the supplemental portion of the reply to the request from the client computer prefetch hint information identifying at least one of the additional files.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
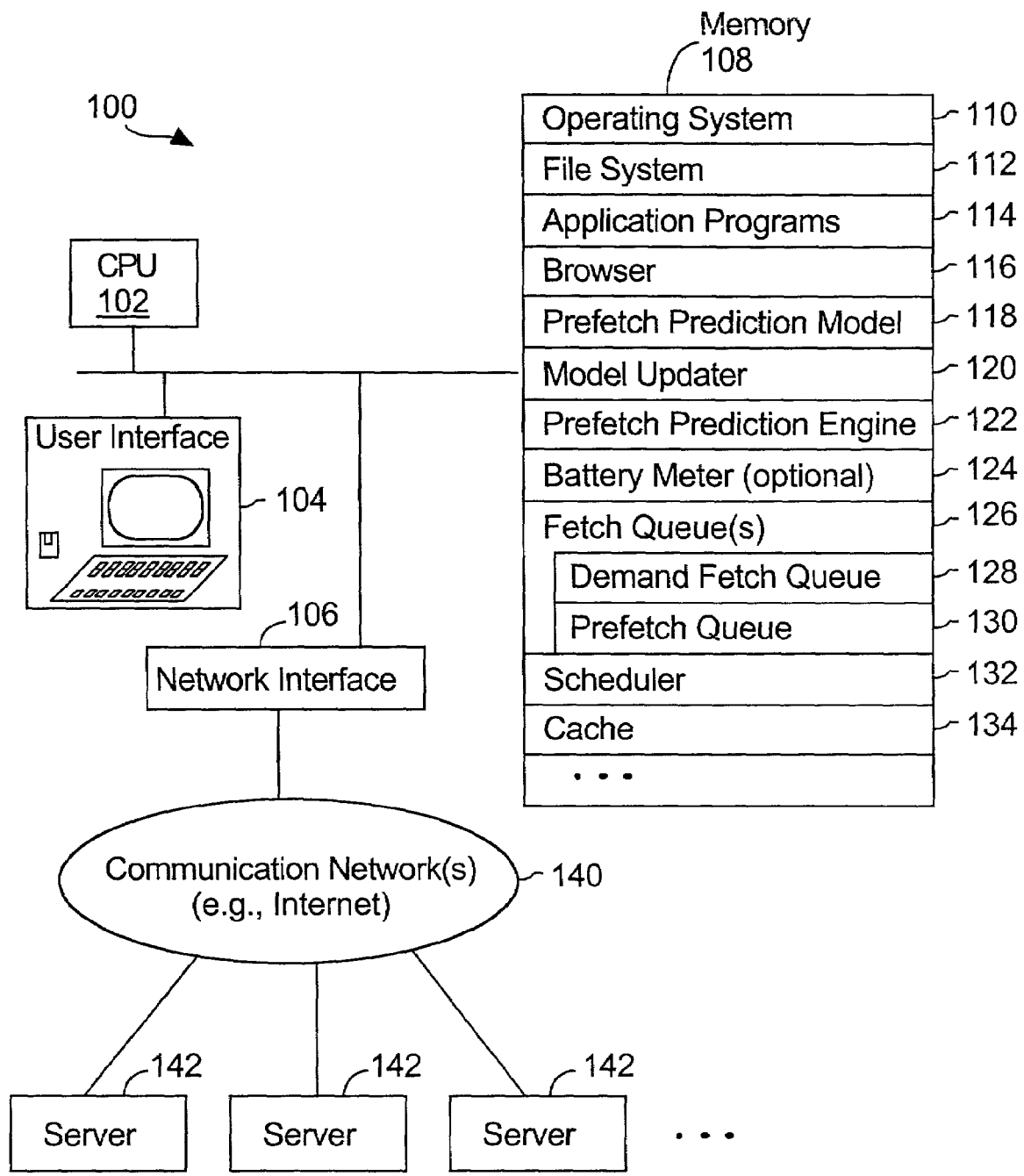
FIG. 1 is a block diagram of a client computer system with a prefetch prediction engine and prefetch prediction model in accordance with a preferred embodiment of the present invention.

Referring to FIG. 1, a client computer system 100 is shown in accordance with the present invention. The system 100 includes memory 108 for storing applications executable by one or more central processing units 102 and data structures such as queues and databases. A user interface 104 allows input by and output to a user of the system. A network interface 106 allows communication through communications network(s) 140 with servers (server computer systems) 220. The network 140 may be the Internet or other wide area network, an intranet, a local area network, a wireless network, or a combination of such communication networks.

In one embodiment, memory 108, which typically includes high speed random access memory as well as non-volatile storage such as disk storage, stores:
- an operating system 110, for providing basic system services;
- file system 112, which may be part of the operating system;
- application programs 114;
- a browser 116, for viewing and requesting documents, such as documents downloaded from servers via the Internet or an intranet;
- a prefetch prediction model 118, which includes energy usage parameters (see FIG. 3) for predicting the impact of prefetching specified files on energy usage by the system;
- a model updater 120, which is a software module for updating the prefetch prediction model 118 based on energy efficiency and utilization of previously prefetched files;
- a prefetch prediction engine 122, which determines, based on the prefetch prediction model 118, which files of a set of prefetch candidates should be prefeteched;
- fetch queues 126, including a demand fetch queue 128 and a prefetch queue 130;
- a scheduler 132 for scheduling downloads of files listed in the demand fetch queue 128 and prefetch queue 130; and
- a cache 134 for storing copies of previously downloaded files, including prefetched files.

Memory 108 may also optionally store a battery meter procedure 124 for receiving information concerning the remaining energy stored in a battery. The remaining energy is sometimes herein called the "current energy supply level." Many of the features of the present invention are not necessarily distinct applications. For example, the prefetch prediction engine 122 and model updater 120 can be implemented using a single software application that implements their joint functionality. In another example, the prefetch prediction model 118 may be implemented as part of the prediction engine 122.

The interaction of the prefetch prediction model 118, model updater 120, prefetch prediction engine 122, battery meter 124, and fetch queues 126 is explained in more detail with reference to FIG. 4. The scheduler 132 is explained in more detail with reference to FIG. 5.

Figure 2:
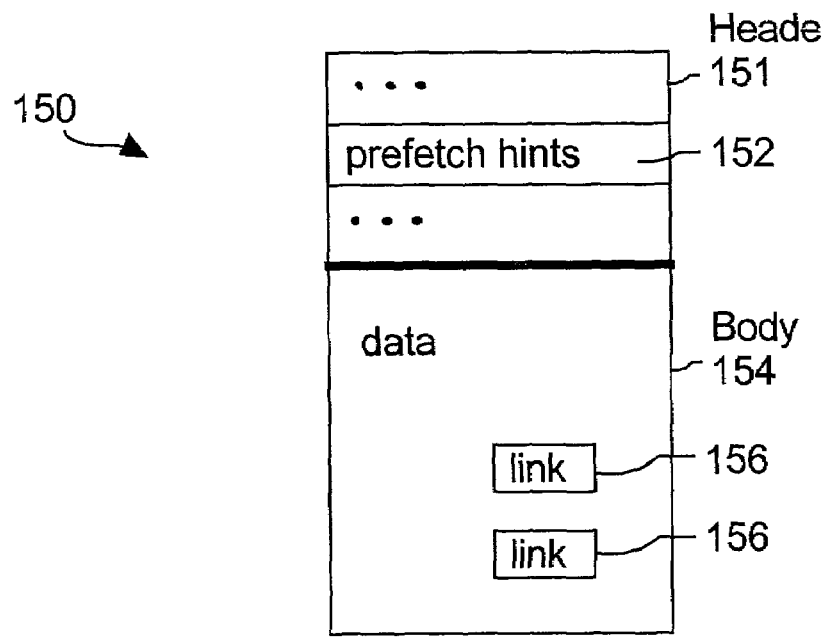
FIG. 2 depicts the data structure of a server's response to a request by a client computer in accordance with an embodiment of the present invention.

Referring to FIG. 2, a message 150 sent by a server to a client in response to a client request typically includes a header 151 and a body 154. The header 151 stores information about the message, such as its source, content-type and encoding. In one preferred embodiment, the header 151 also includes an additional field 152 for storing prefetch hints. The prefetch hints are URLs or network addresses of files that the client computer may decide to prefetch. For instance, the client computer may prefetch one or more of the files represented by the prefetch hints 152 while decoding the file or other content in the body 154 of the message 150. The body 154 of the message contains the content of the message, such as a file or HTML page, and that content may include links or tags 156 that reference other files. The files referenced by the links or tags 156 are also candidates for prefetching by the client computer. In one embodiment the prefetch hints include a probability value for each URL or network address listed in the prefetch hints. The probability value indicates the predicted probability that the associated file will be requested by the client which sent the client request.

Prefetch Prediction Model

Figure 3:
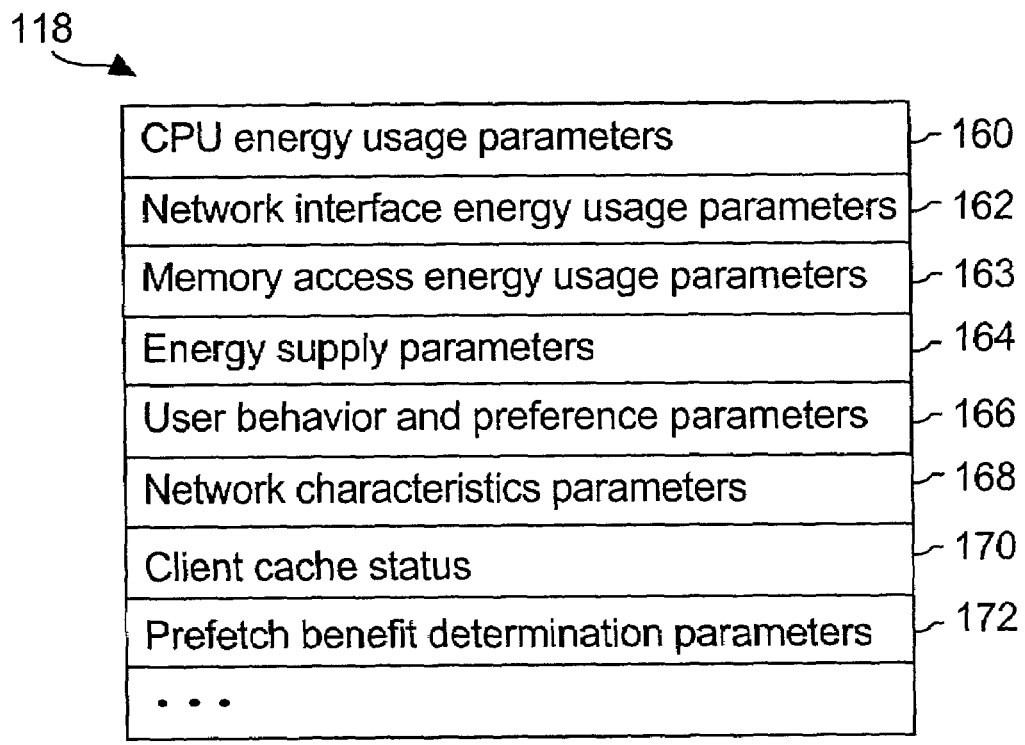
FIG. 3 is a block diagram of a prefetch prediction model.

Referring to FIG. 3, the prefetch prediction model 118 in a preferred embodiment includes several types of parameters, such as energy usage parameters, user usage pattern parameters, network characteristics and so on. More specifically, the prefetch prediction model 118 preferably includes two or more of the following types of parameters:
- CPU energy usage parameters 160, for instance indicating CPU energy usage per prefetch, additional CPU energy used for downloading various types of files, CPU energy during idle time, CPU fixed energy required to send a packet, CPU energy/byte required to send a packet, CPU fixed energy required to receive a packet, and CPU energy/byte required to receive a packet;
- Network interface energy usage parameters 162, for instance network interface fixed energy required to send a packet, network interface energy/byte (energy usage per byte) required to send a packet, network interface fixed energy required to receive a packet, network interface energy/byte (energy usage per byte) required to receive a packet, network interface energy to enter sleep mode, network interface time to enter sleep mode, network interface energy to exit sleep mode, network interface time to exit sleep mode, network interface power during idle mode, and network interface power during sleep mode;
- Memory access energy usage parameters 163, for instance memory read/write energy costs per byte or word, and energy costs of DMA operations;
- Energy supply parameters 164, for instance total energy availability, efficiency loss as a function of power drain, and energy efficiency as a function of power usage mode (e.g., as a function of level of power load, and pulsed mode vs continuous mode);
- User behavior and preference parameters 166, for instance estimate of user's apparent think time (estimate of mean or median time between a client's request for a file and the client's subsequent request for another file), preference for speed versus battery lifetime, preference for speed versus battery lifetime as a function of remaining battery lifetime, history of user's recent references, and prefetch-benefit threshold;

Network characteristics parameters 168, for instance link bandwidth, current link utilization, and round-trip time to server;

Client cache status 170, for instance the degree of utilization of a cache, allowable cache lifetime, cache entries, and stale cache entries; and Prefetch benefit determination parameters 172, for instance the estimated energy costs and benefits of doing a given prefetch or type of prefetch.

While the above description of the prefetch prediction model 118 refers to parameters concerning "a user," when the client computer system is a multi-user system the prefetch prediction model and mechanisms of the present preferably take into account the preferences and actions of multiple users of a client computer system.

Operation of Prefetch System Components

Figure 4:
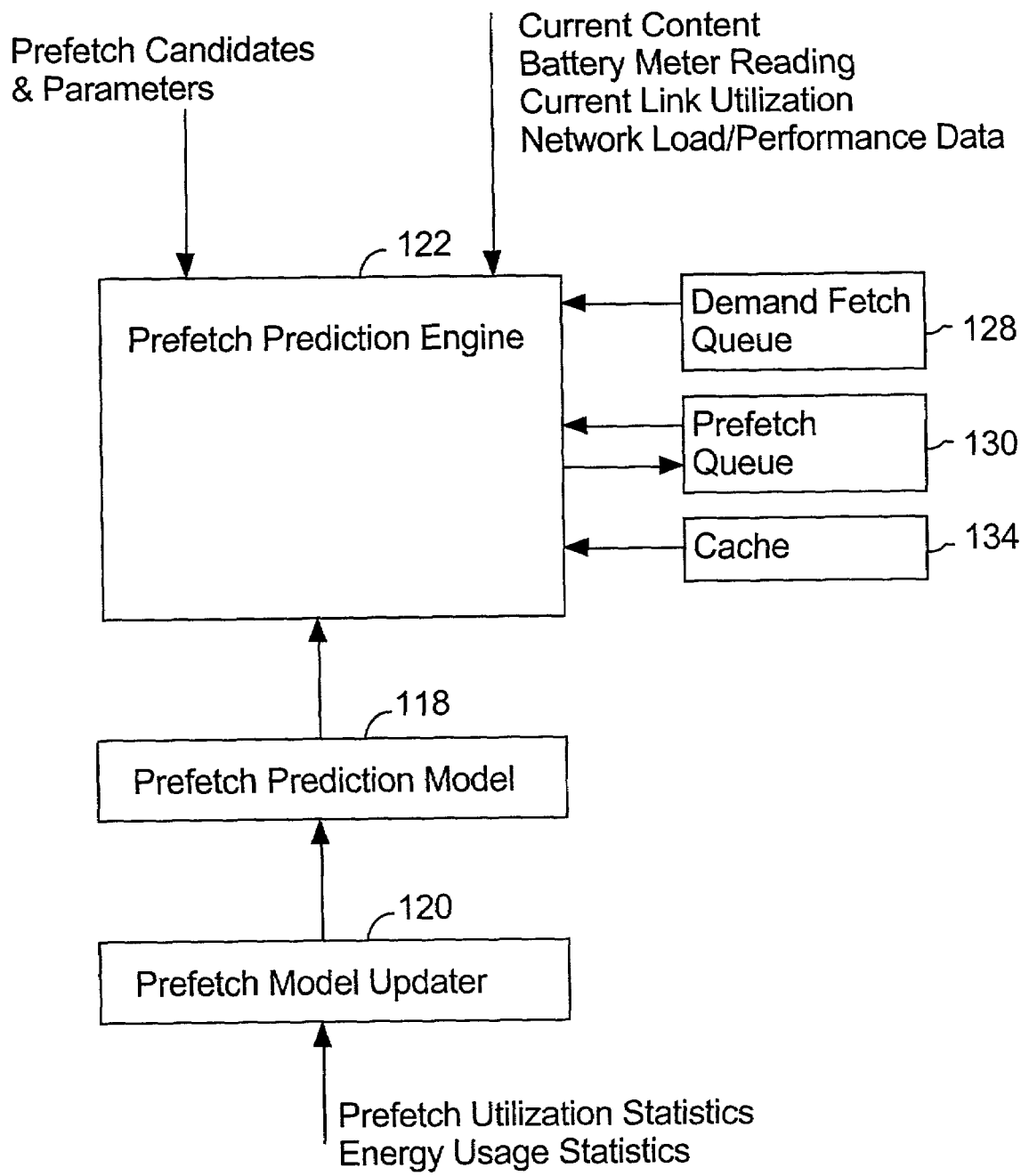
FIG. 4 is a block diagram of system components interoperating with a prefetch prediction engine.

Referring to FIG. 4, prefetch model updater 120 receives usage statistics, such as prefetch utilization statistics (concerning the quantity and types of prefetched files which were used by the client computer prior to the prefetched files being evicted from the cache 134) and energy usage statistics (concerning the energy used by prefetch operations and the net energy saved or lost by prefetch operations), and uses that information to adjust prefetch prediction model 118 to changing conditions. Prefetch prediction engine 122 uses prefetch prediction model 118, along with user information and system status data to predict the net impact on energy usage by the client computer that would result from prefetching specified files in a list of prefetch candidates, and to determine which prefetch candidates to add to the prefetch queue 130. The information and data used by the prefetch prediction engine 122 for this purpose preferably includes at least two of the following types of information and data:

user behavior and preferences,
the content currently being viewed or used by the client,
the rate at which the user has been requesting new files or pages,
the status (e.g., fullness) of the client computer cache 134,
the current energy level (battery meter reading) of the client computer;
current network congestion;
bandwidth availability between the client computer system and the server; and
round-trip time from client to server.

In another embodiment, the prefetch prediction engine 122 predicts the net impact on energy usage by the overall system (including client, server and other system components) that would result from prefetching specified files from a list of prefetch candidates.

If an entry or item in the list of prefetch candidates identifies a specified file that is already in the demand fetch queue 128, the prefetch prediction engine preferably deletes that entry from the list of entries to be added to the prefetch queue 130. If an entry corresponding to a specified file is in cache 134, the prefetch prediction engine 122 does not add it to the prefetch queue 130, unless the entry in the cache is stale. If an entry corresponding to a specified file is already in prefetch queue 130, the corresponding entry in prefetch queue may be removed or modified as appropriate.

Figure 5:
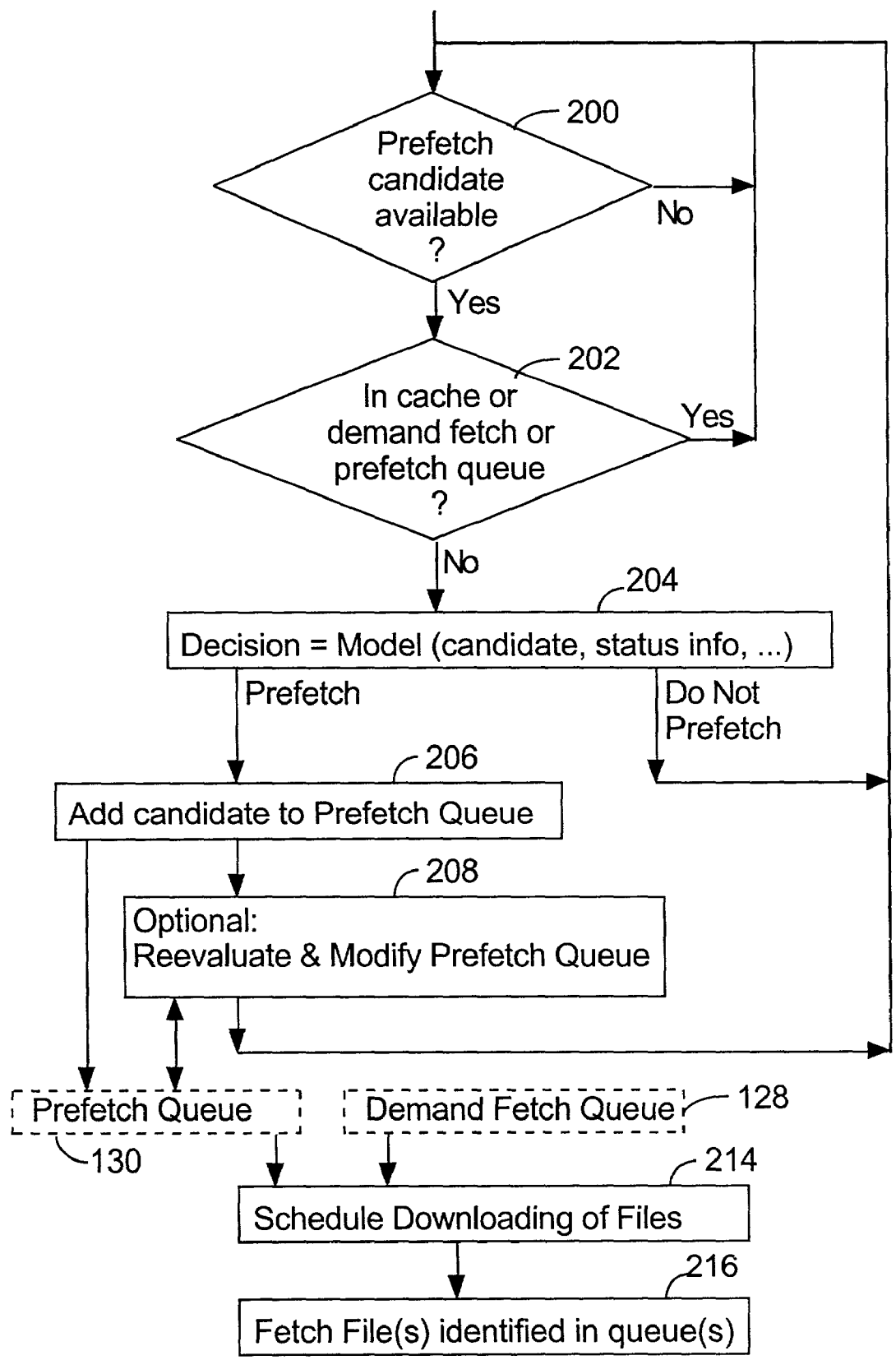
FIG. 5 is a flow chart of an energy efficient prefetching method performed by a client computer.

Referring to FIG. 5, if there is a prefetch candidate available (step 200) and if the prefetch candidate is not in the cache, demand fetch queue, or prefetch queue (step 202), then a decision—based upon the candidate, status information and other data—is made as to whether to prefetch the candidate (step 204). As discussed above, the prefetch decision at step 204 is made by the prefetch prediction engine 122 using the prefetch prediction model 118 to determine if the benefits of prefetching the candidate are predicted to outweigh the costs, including energy usage associated with the prefetch operation. If the decision is to prefetch, the candidate is added to the prefetch queue (step 206). Optionally, the prefetch prediction engine may include queue pruning instructions for re-evaluating entries in the queue and flushing from the queue any entries in the queue deselected by the re-evaluating (step 208). For instance, the prefetch prediction engine may replace (at step 208) a least desirable entry in the prefetch queue with an entry for the candidate currently being processed.

In a preferred implementation, the prefetch queue is completely or partially flushed (at step 208) when the prefetch prediction engine determines that all or some of the queued prefetches are not likely to be useful. For example, such a flushing of the prefetch queue may be performed when an application in the client computer issues a request for an object that is not in the local cache, is not in the process of being demand fetched, and is not in the prefetch queue. If these conditions are satisfied (i.e., a miss occurs), then the entity (e.g., the prefetch prediction engine 122) that re-evaluates the prefetch queue (e.g., at step 208, FIG. 5) may decide that some or all of the pending prefetch entries correspond to a "path" that the client is unlikely to follow, and that therefore these entries should be deleted. On the other hand, despite the miss, the prefetch prediction engine may nevertheless continue to predict that some of the items in the prefetch queue will be required in the future, in which case those items are not flushed from the prefetch queue. The items remaining in the prefetch queue are prefetched when the client computer system is able to schedule those items to be fetched.

After the current candidate has been processed and a decision has been made with regard to that candidate, the prefetch candidate filtering process resumes at step 200.

The prefetch queue 130 may be reevaluated and modified (step 208) at any time prior to scheduling downloading of the files listed in the prefetch queue (step 214).

A scheduler 132 (FIG. 1) reads the entries in the prefetch queue 130 and demand fetch queue 128 and schedules the downloading of the files listed in those entries (step 214). Typically, entries in the demand fetch queue 128 are given higher priority by the scheduler than entries in the prefetch queue 130. The files scheduled for downloading are fetched (step 216) in accordance with their scheduling for use by the client computer and/or for storage in the cache 134 for possible later use by the client computer.

Server Computer Prefetch Prediction

Figure 6:
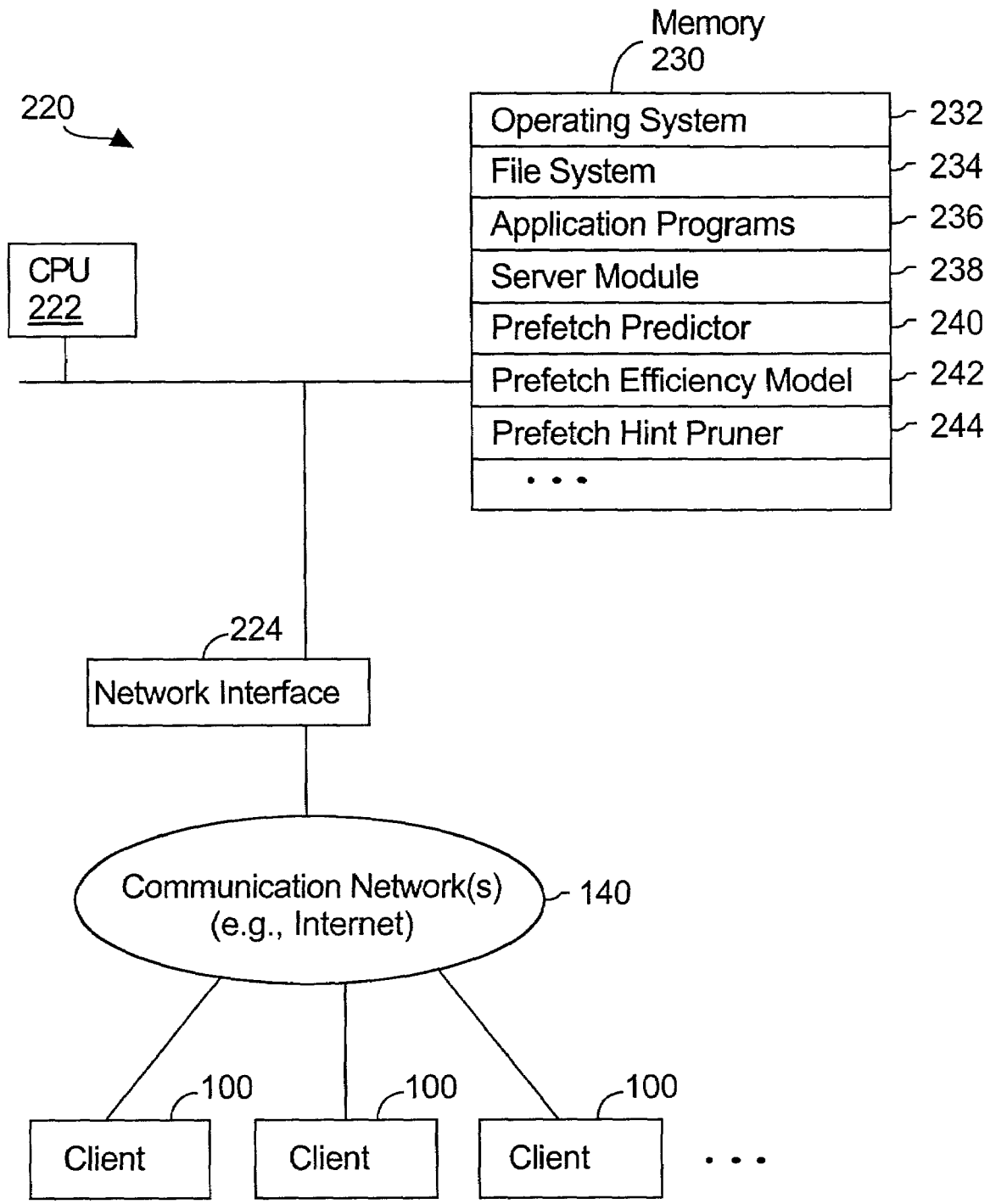
FIG. 6 is a block diagram of a server computer system with a prefetch predictor and prefetch prediction model in accordance with a preferred embodiment of the present invention.

Referring to FIG. 6, a server computer system (server) 220 is shown in accordance with the present invention. The server computer system 220 includes memory 230 for storing applications executable by one or more central processing units 222 and data structures such files and the like. A network interface 224 allows communication through communications network(s) 140 with clients (client computer systems) 100.

In one embodiment, memory 230, which typically includes high speed random access memory as well as non-volatile storage such as disk storage, stores:

- an operating system 232, for providing basic system services;
- a file system 234, which may be part of the operating system;
- application programs 236;
- a server module 238, for receiving and processing client requests, such as a request for a specified file;
- a prefetch predictor 240, for identifying files for possible prefetching by a client 228;
- a prefetch efficiency model 242;
- a prefetch hint pruner 244, for utilizing the prefetch efficiency model to prune the set of identified files so as to improve energy efficiency in prefetching and to eliminate prefetches that the system decides, upon re-evaluation, are not likely to be requested by the client.

The interaction of the server module 238, prefetch predictor 240, prefetch efficiency model 242, and prefetch hint pruner 244 is explained in more detail with reference to FIG. 8.

Figure 7:
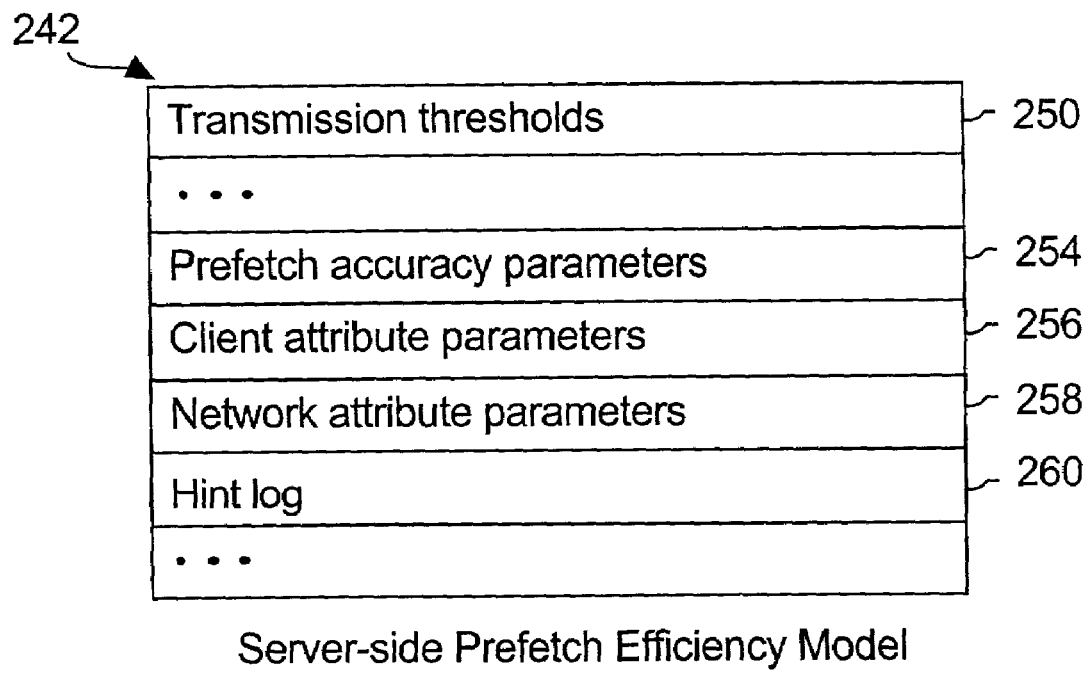
FIG. 7 is a block diagram of a server-side prefetch efficiency model.

Referring to FIG. 7, the server-side prefetch efficiency model 242 in a preferred embodiment includes several types of parameters, such as transmission thresholds, accuracy statistics and so on. Some of the parameters in the server-side prefetch efficiency model 242 have values that change dynamically in accordance with changes in the operating environment of the server computer system. The prefetch efficiency model 242 preferably includes one or more of the following types of parameters for use by the server-side prefetch predictor 240:

- transmission thresholds 250, for instance the maximum number of hints to send per reply, and the maximum size (in bytes) of hints to send per reply; and
- prefetch accuracy statistics 254 (e.g., statistics received from one or more client computers).

In addition, the prefetch efficiency model 242 preferably includes one or more of the following types of parameters for use by the server-side prefetch pruner 244:

- client attribute parameters 256, for instance parameters sent by the client from the client's prefetch prediction model;
- network attribute parameters 258, for instance the bandwidth and congestion level of the network connection between the server and each client with which it has a current client-server session; the network attribute parameters 258 enable the server's prefetch pruner to determine an estimated data transfer time for each prefetch candidate; and
- a hint log 260, for instance a log of the URLs or network addresses for which the server has sent prefetch hints to each client during a current client-server session; the log may also include a record of the files fetched by each client, and may further indicate the time that the files were fetched so as to enable the server to determine which of those files may be considered to be stale (i.e., beyond the allowed cache lifetime).

Figure 8:
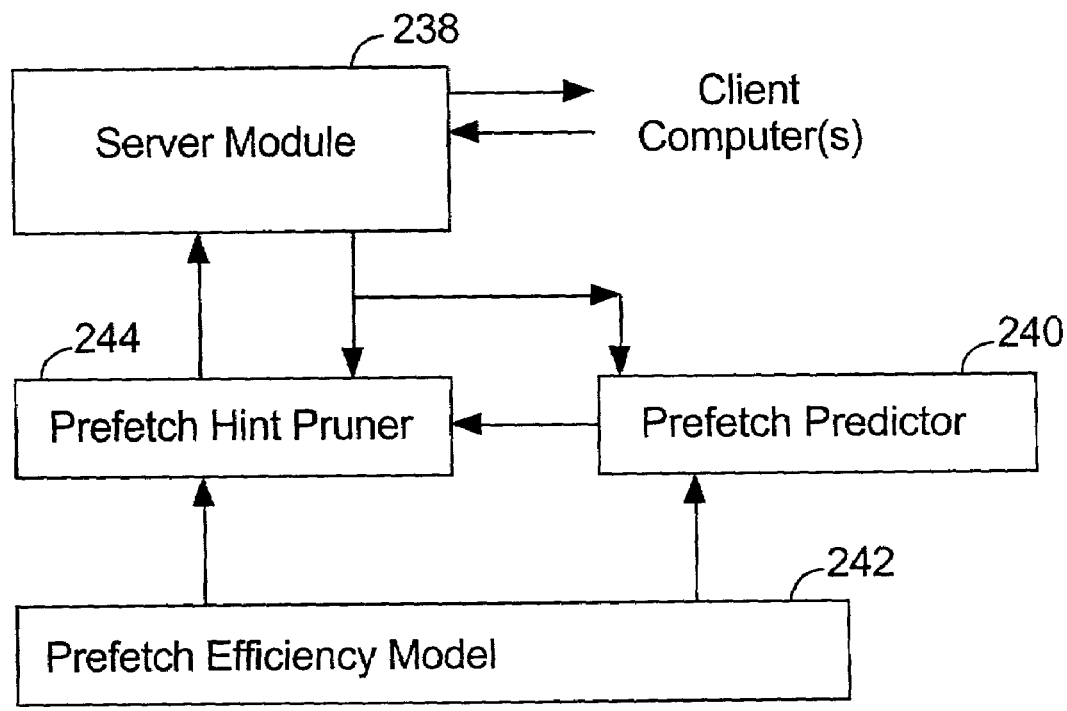
FIG. 8 is a block diagram of a server module having a prefetch hint pruner as well as a prefetch predictor and prefetch efficiency model.

Referring to FIG. 8, server module 238 receives a request from client computer for a specified file. Prefetch predictor 240, utilizing data provided by the server module 238, identifies additional files for possible prefetching. Prefetch hint pruner 244, before forwarding the additional files to the server module 238, prunes the list of identified additional files in accordance with prefetch efficiency model 242. The pruning consists of removing from the list references to one or more of the files that do not meet the requirements of the prefetch efficiency model 242. The server module 238 then sends a reply to the client computer. The reply includes a content portion (see FIG. 2) containing the specified file and a supplemental portion containing prefetch hint information identifying at least one of the additional files.

Figure 9:
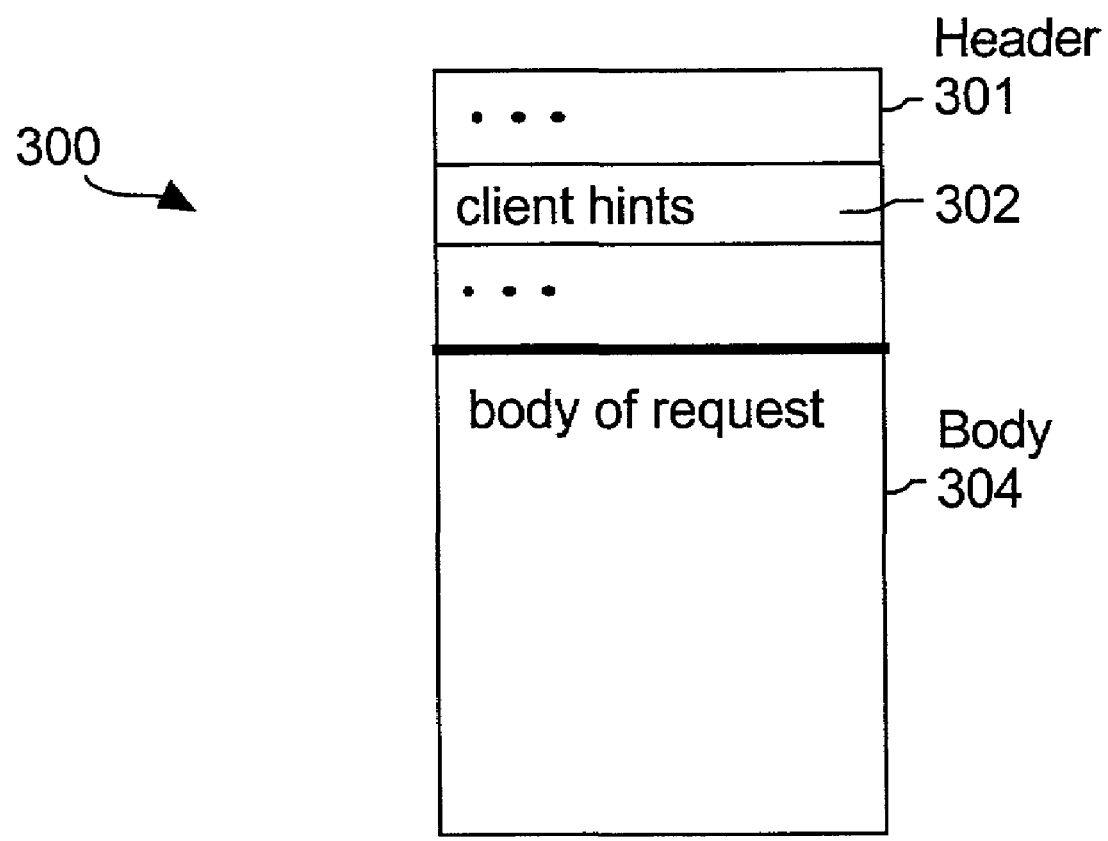
FIG. 9 depicts the data structure of a client's request message to a server in accordance with an embodiment of the present invention.

Referring to FIG. 9, a request message 300 sent by a client to a server typically includes a header 301 and a body 304. The header 301 stores information about the message, such as its destination and encoding. In one preferred embodiment, the header 301 also includes an additional field 302 for storing client hints. The client hints are a subset of the parameters of the client's prefetch prediction model, or parameters derived at least in part from the client's prefetch prediction model. For instance, the client hints 302 may include the client's costs for sending and receiving data bytes and packets and the client's threshold value for predicted prefetch probabilities. The body 304 of the request message contains the client request, such as the URL or network address of the document being requested by the client and parameters (if any) for specifying dynamic content to be produced by the server while responding to the client request.

Alternate Embodiments

In an alternate embodiment, the prefetch prediction model (client computer system, FIG. 1) or prefetch efficiency model (server computer system, FIG. 6) includes cost prediction parameters not based on energy usage or not solely based on energy usage. In this alternate embodiment, it is advantageous to reduce the monetary charges incurred by the client's network activity. For instance, the prefetch prediction model may include one or more parameters that take into account network usage charges associated with each packet or message transmission, or based on the number of bytes transmitted, without regard to the amount of energy used. In some implementations, the use of predictive prefetching may increase the monetary charges incurred by the client computer system. In these implementations the role of the prefetch prediction engine and prefetch prediction model are to ensure that only the most cost efficient prefetches are performed. One or more threshold parameters (e.g., a threshold probability that each prefetched file will be used by the client) in the prefetch prediction model are based on the amount of additional cost the client is willing to incur, on average, in exchange for the latency reduction obtained by prefetching files predicted to be needed by the client in the future.

In another alternate embodiment, a client computer system has multiple wireless network 10 interfaces (e.g., radios) that operate simultaneously, each having different energy/byte and latency/byte costs. In such an embodiment, the client computer system may be configured to use the wireless interface with the lowest energy/byte for prefetches of files that are not likely to be required by the client immediately or that are less likely to be used by the client, and to otherwise use a wireless interface with higher energy/byte costs (and presumably lower latency/byte).

The present invention can be implemented as a computer program product that includes a computer program mechanism embedded in a computer readable storage medium. For instance, the computer program product could contain the program modules shown in FIG. 1 or 6 or both. These program modules may be stored on a computer hardware storage medium such as a CD-ROM, magnetic disk storage product, or computer transmission type media such as any other computer readable data. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer program product for use in conjunction with a client computer system having at least one application having instructions for specifying files to be fetched from a server, the computer program product comprising a computer hardware storage medium and a computer program mechanism embedded therein, the computer program mechanism comprising:
    a prefetch prediction model including energy usage parameters for predicting an impact on energy usage by the client computer system that would result from prefetching specified files;
    a prefetch prediction engine coupled to the prefetch prediction model for evaluating the specified files with respect to prefetch criteria, including energy efficiency prefetch criteria, and generating a prefetch decision with respect to each file of the specified files;
    instructions for storing in a queue entries identifying each specified file for which the prefetch prediction engine generates an affirmative prefetch decision; and instructions for fetching files identified by entries in the queue.

2. The computer program product of claim 1, including a model updater, coupled to the prefetch prediction model, for updating the energy usage parameters of the prefetch prediction model in accordance with results of past prefetch decisions.

3. The computer program product of claim 1, including instructions for detecting a current energy supply level of the client computer system, wherein the prefetch criteria include criteria that are a function of die current energy supply level of the client computer system.

4. The computer program product of claim 1, including instructions for detecting fullness of a cache in the client computer system, wherein the prefetch criteria include criteria that are a function of the cache fullness.

5. The computer program product of claim 1, wherein at least one of the specified files is identified in a message received from the server.

6. The computer program product of claim 1, wherein at least one of the specified files is identified by the at least one application in the client computer system.

7. The computer program product of claim 1, wherein the queue comprises a prefetch queue;
    the computer program mechanism further comprising:
    instructions for storing in a fetch queue entries identifying the files specified by the at least one application program to be fetched; and
    a scheduler for scheduling downloading of files identified by carries in the fetch queue and files identified by entries in the prefetch queue, the scheduler giving priority to the files identified by the entries in the fetch queue.

8. The computer program product of claim 7, wherein the scheduler includes instructions for determining whether to download a file identified by an entry in the prefetch queue in accordance with predefined scheduling criteria, the predefined scheduling criteria including at least one criteria selected from the set consisting of client cache status, user behavior and preferences, network congestion, bandwidth availability between the client computer system and the server, round-trip time from client to server, and a current energy supply level of the client computer system.

9. The computer program product of claim 1, including queue pruning instructions for re-evaluating entries in the queue and flushing from the queue any entries in the queue deselected by the re-evaluating.

10. The computer program product of claim 1, including a model updater, coupled to the prefetch prediction model, for updating the energy usage parameters of the prefetch prediction model in accordance with energy usage statistics.

11. A method for performing energy efficient data prefetching in conjunction with a client camp titer system, comprising:
    predicting, in accordance with a prefetch prediction model having energy usage parameters, an impact on energy usage by the client computer system that would result from prefetching specified files;
    evaluating the specified files with respect to prefetch criteria, including energy efficiency prefetch criteria;
    generating a prefetch decision with respect to each file of the specified files; storing in a queue entries identifying each specified file for which an affirmative prefetch decision was generate; and
    fetching files identified by entries in the queue.

12. The method of claim 11, updating the energy usage parameters of the prefetch prediction modal in accordance with results of past prefetch decisions.

13. The method of claim 11, wherein the prefetch criteria include criteria that are a function of a current energy supply level of the client computer system.

14. The method of claim 11, wherein the prefetch criteria include criteria that are a function of cache fullness of the client computer system.

15. The method of claim 11, including receiving a message from a server that includes information identifying at least one of the specified files.

16. The method of claim 11, including executing at least one application that specifies files to be fetched from a server, the executing of the at least one application including identifying at least one of the specified files.

17. The method of claim 16, wherein the queue comprises a prefetch queue; the method further comprising:
    storing in a fetch queue entries identifying the files specified by the at least one application program to be fetched; and
    scheduling downloading of files identified by entries in the fetch queue and files identified by entries in the prefetch queue, giving priority to the files identified by the entries in the fetch queue.

18. The method of claim 17, further comprising:
    determining whether to download a file identified by an entry in the prefetch queue in accordance with predefined scheduling criteria, the predefined scheduling criteria including at least one criteria selected from the set consisting of client cache status, user behavior and preferences, network congestion, bandwidth availability between the client computer system and the server, round-trip time from client to server, and a current energy supply level of the client computer system.

19. The method of claim 11, further comprising:
    re-evaluating entries in the queue and flushing from the queue any entries in the queue deselected by the re-evaluating.

20. The method of claim 11, updating the energy usage parameters of the prefetch prediction model in accordance with energy usage statistics.

21. A computer system comprising:
at least one processing unit for executing procedures containing executable instructions;
a prefetch prediction model including energy usage parameters for predicting an impact on energy usage by the computer system that would result from prefetching specified files;
a prefetch prediction engine, executable by the at least one processing unit and coupled to the prefetch prediction model, for evaluating the specified files with respect to prefetch criteria, including energy efficiency prefetch criteria, and generating a prefetch decision with respect to each file of the specified files;
memory, including a queue for storing entries identifying each specified file for which the prefetch prediction engine generates an affirmative prefetch decision; and
a download module, executable by the at least one processing unit, having instructions for fetching files identified by entries in the queue.

22. The computer system of claim 21, including a model updater, executable by the at least one processing unit, coupled to the prefetch prediction model, for updating the energy usage parameters of the prefetch prediction model in accordance with results of past prefetch decisions.

23. The computer system of claim 21, including an energy supply detection module, executable by at least one processing unit, having instructions for detecting a current energy supply level of the computer system, wherein the prefetch criteria include criteria that are a function of the current energy supply level of the computer system.

24. The computer system of claim 21, wherein the memory further includes a cache, the computer system further comprising a cache fullness detection module, executable by the at least one processing unit, having instructions for detecting fullness of the cache, wherein the prefetch criteria include criteria that are a function of the cache fullness.

25. The computer system of claim 21, wherein at least one of the specified files is identified in a message received from a server.

26. The computer system of claim 21, further comprising at least one application, executable by the at least one processing unit, wherein at least one of the specified files is identified by the at least one application.

27. The computer system of claim 21, wherein the queue comprises a prefetch queue; the computer system further comprising:
at least one application, executable by the at least one processing unit, having instructions for specifying files to be fetched from a server;
a fetch queue queuing module, executable by the at least one processing unit, having instructions for storing in a fetch queue entries identifying the files specified by the at least one application; and
a scheduler for scheduling downloading of files identified by entries in the fetch queue and files identified by entries in the prefetch queue, the scheduler giving priority to the files identified by the entries in the fetch queue.

28. The computer system of claim 27, wherein the scheduler includes instructions for determining whether to download a file identified by an entry in the prefetch queue in accordance with predefined scheduling criteria, the predefined scheduling criteria including at least one criteria selected from the set consisting of cache status, user behavior and preferences, network congestion, bandwidth availability between the computer system and the server, round-trip time between the computer system and the server, and a current energy supply level of the computer system.

29. The computer system of claim 21, including a queue pruner, executable by the at least one processing unit, including queue pruning instructions for queue pruning instructions for re-evaluating entries in the queue and flushing from the queue any entries in the queue deselected by the re-evaluating.

30. The computer system of claim 21, including a queue pruner, executable by the at least one processing unit, including queue pruning instructions for prioritizing the entries in the queue and for removing from the queue a first entry identifying a previously specified file for which the prefetch prediction engine generated an affirmative prefetch decision, where said first entry is assigned a lower priority than a second entry in the queue.

31. The computer system of claim 21, including a model updater, executable by the at least one processing unit, coupled to the prefetch prediction model, having instructions for updating the energy usage parameters of the prefetch prediction model in accordance with energy usage statistics.

32. A computer system comprising:
at least one processing unit for executing procedures containing executable instructions;
a server module, executable by the at least one processing unit, for responding to a request from a client computer for a specified file and for generating a reply to the request, the reply including a content portion comprising the specified file; and
a prefetch predictor, executable by the at least one processing unit, for identifying additional files for possible prefetching by the client computer, wherein criteria for identifying includes energy efficiency criteria the server module including instructions for including in a supplemental portion of the reply to the request from the client computer prefetch hint information identifying at least one of the additional files, wherein the supplemental portion is distinct from the content portion of the reply.

33. The computer system of claim 32, wherein the prefetch hint information includes predicted prefetch probability information for at least one of the identified additional files.

34. The computer system of claim 32, wherein the prefetch hint information includes meta information for at least one of the identified additional files, the meta information selected from the group consisting of file size information, file type information and information indicating a specific relationship to the specified file in the content portion of the reply.

35. The computer system of claim 32, wherein the prefetch hint information includes an initial additional set of files, the computer system further comprising a pruner, executable by the at least one processing unit, including instructions for selectively removing at least one file of the initial additional set of files.

36. The computer system of claim 35, further comprising a prefetch efficiency model, including prefetch efficiency parameters for predicting an impact on energy usage by the client computer that would result from prefetching specified files, coupled to the pruner, the pruner utilizing the prefetch efficiency model to selectively remove the at least one file of the initial additional set of files.

37. A computer program product for use in conjunction with a client computer system having at least one application having instructions for specifying files to be fetched from a server, the computer program product comprising a computer hardware storage medium and a computer program mechanism embedded therein, the computer program mechanism comprising:

a prefetch prediction model including cost parameters for predicting an impact on monetary charges incurred by the client computer system that would result from prefetching specified files;

a prefetch prediction engine coupled to the prefetch prediction model for evaluating the specified files with respect to prefetch criteria, including cost efficiency prefetch criteria, and generating a prefetch decision with respect to each file of the specified files; instructions for storing in a queue entries identifying each specified file for which the prefetch prediction engine generates an affirmative prefetch decision; and instructions for fetching files identified by entries in the queue.

38. A method for performing energy efficient data prefetching in conjunction with a client computer system, comprising:

predicting, in accordance with a prefetch prediction model having cost parameters, an impact on monetary charges incurred by the client computer system that would result from prefetching specified files;

evaluating the specified files with respect to prefetch criteria, including cost efficiency prefetch criteria;

generating a prefetch decision with respect to each file of the specified files;

storing in a queue entries identifying each specified file for which an affirmative prefetch decision was generated; and fetching files identified by entries in the queue.

39. A computer system comprising:

at least one processing unit for executing procedures containing executable instructions;

a prefetch prediction model including cost parameters for predicting an impact on monetary charges incurred by the computer system that would result from prefetching specified files;

a prefetch prediction engine, executable by the at least one processing unit and coupled to the prefetch prediction model, for evaluating the specified files with respect to prefetch criteria, including cost efficiency prefetch criteria, and generating a prefetch decision with respect to each file of the specified files;

memory, including a queue for storing entries identifying each specified file for which the prefetch prediction engine generates an affirmative prefetch decision; and a download module, executable by the at least one processing unit, having instructions for fetching files identified by entries in the queue.

* * * * *

UNITED STATES PATENT AND TRADEMARK OFFICE
CERTIFICATE OF CORRECTION

PATENT NO. : 7,437,438 B2  Page 1 of 1
APPLICATION NO. : 10/033404
DATED : October 14, 2008
INVENTOR(S) : Jeffrey Clifford Mogul et al.

It is certified that error appears in the above-identified patent and that said Letters Patent is hereby corrected as shown below:

In column 8, line 49, after "network" delete "10".

In column 9, line 39, in Claim 3, delete "die" and insert -- the --, therefor.

In column 9, line 58, in Claim 7, delete "carries" and insert -- entries --, therefor.

In column 10, line 14, in Claim 11, delete "camp titer" and insert -- computer --, therefor.

In column 10, line 26, in Claim 11, delete "generate" and insert -- generated --, therefor.

In column 10, line 29, in Claim 12, delete "modal" and insert -- model --, therefor.

In column 11, line 29, in Claim 23, after "by" insert -- the --.

In column 12, line 36, in Claim 32, delete "criteria" and insert -- criteria; --, therefor.

Signed and Sealed this

Eleventh Day of August, 2009

David J. Kappos
*Director of the United States Patent and Trademark Office*